Figure 1:
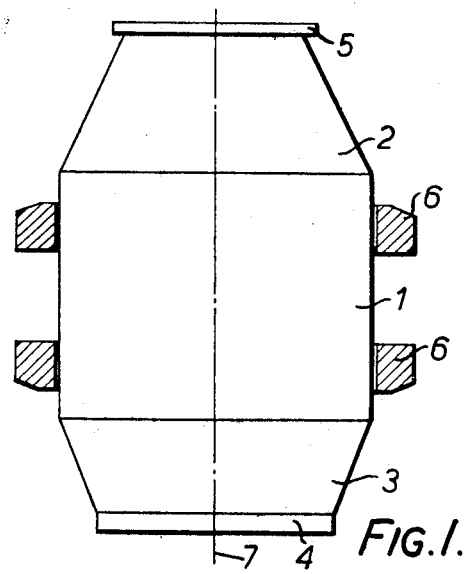

United States Patent [19]

Atkinson

[11] 3,734,479
[45] May 22, 1973

[54] HOLLOW VESSEL WITH ANNULAR EXTERNAL SUPPORT RING

[75] Inventor: Donald Alan Atkinson, Teesside, England

[73] Assignee: Ashmore, Benson, Pease & Company Limited, Stockton-on-Tee, Teesside, England

[22] Filed: Jan. 19, 1972

[21] Appl. No.: 218,939

[52] U.S. Cl. ................................. 266/36, 263/33
[51] Int. Cl. ............................................ F27b 7/22
[58] Field of Search ...................... 266/35, 36, 18; 263/35, 33

[56] References Cited

UNITED STATES PATENTS

| 554,457 | 2/1896 | Price | 266/36 |
| 3,182,979 | 5/1965 | Krause | 263/33 |

FOREIGN PATENTS OR APPLICATIONS

| 1,296,287 | 5/1962 | France | 266/35 |
| 737,852 | 7/1966 | Canada | 266/35 |

*Primary Examiner*—Andrew R. Juhasz
*Assistant Examiner*—William R. Briggs
*Attorney*—Joseph F. Brisebois and John A. Teketis

[57] ABSTRACT

A hollow vessel, conveniently a converter for use in a steel making process, has at least one annular ring surrounding it. The ring is removably secured to the wall of the vessel by pairs of clamping members attached to either the ring or the vessel and clamped on to opposed surfaces on the vessel or the ring respectively. Removable keys extending substantially parallel to the axis of the vessel and positioned between the clamping members and projections on the vessel reduce angular movement between the vessel and ring almost to zero.

9 Claims, 4 Drawing Figures

PATENTED MAY 22 1973 3,734,479

SHEET 1 OF 2

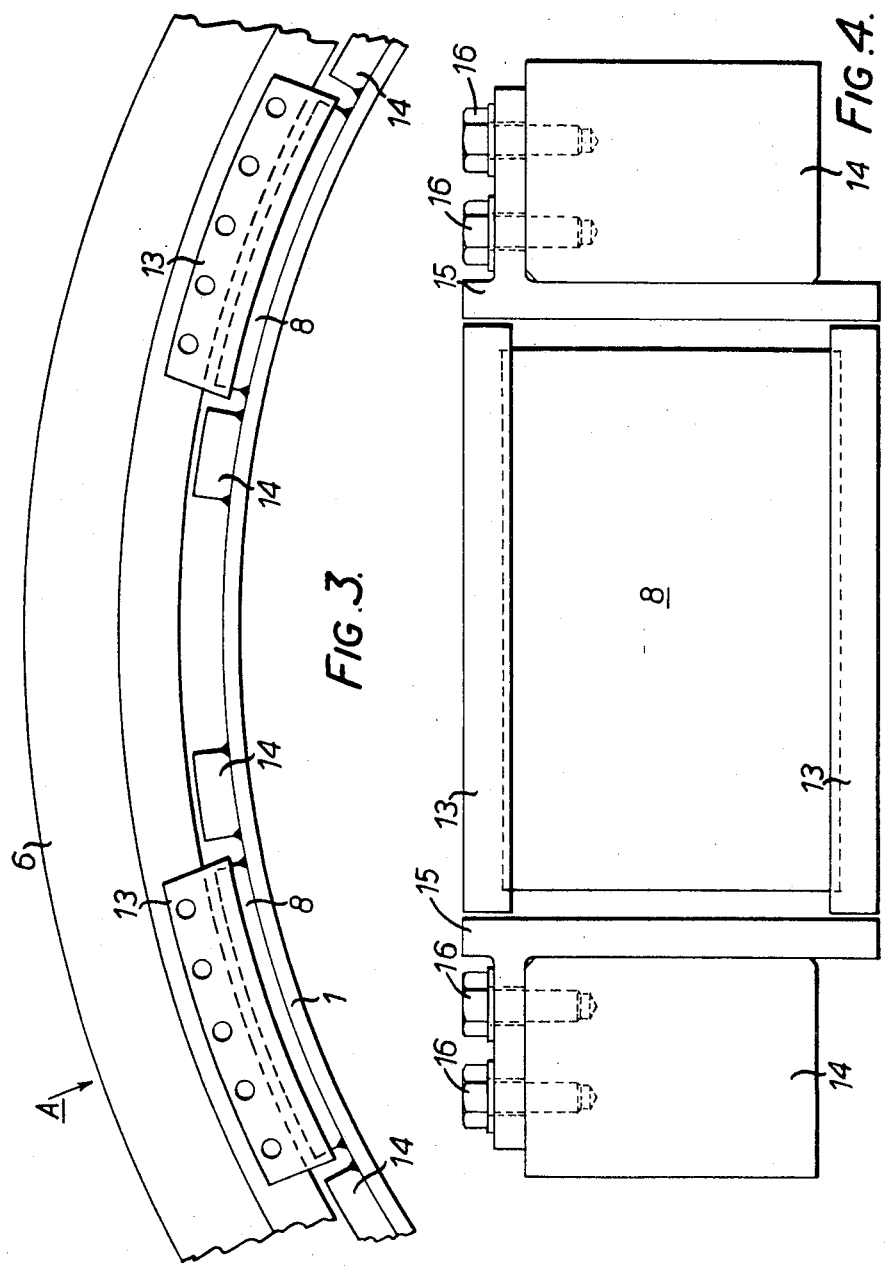

HOLLOW VESSEL WITH ANNULAR EXTERNAL SUPPORT RING

This invention relates to hollow vessels having at least one annular ring surrounding and attached thereto. A particular, but not sole, application of the invention is to a hollow vessel constituting a converter for use in a steel making process. Hereinafter the invention will be described in its application to a converter but the invention applies equally to any hollow vessel which is provided with at least one external ring attached thereto.

A converter is supported by a pair of track rings which surround and are attached to a cylindrical part of the converter vessel and the track rings are in turn supported on a number of driven rollers, and rotational drive to rotate the converter about its longitudinal axis is transmitted from the rollers to the track rings. In the case of a converter, the manner in which the track rings are attached to the vessel is of considerable importance since, during use, a differential expansion will be experienced between the vessel and the track rings.

It is an object of the present invention to provide a vessel having at least one annular ring surrounding it which will allow differential expansion between the ring and the vessel but which will at the same time accurately locate the ring on the vessel so as to transmit rotational drive to the vessel via the annular ring. It is a further object of the invention that the annular ring can be removed readily from the vessel when required.

According to a first aspect of the present invention a hollow vessel has at least one annular ring coaxial with the longitudinal axis thereof and surrounding and spaced from the wall of the vessel, the ring having pairs of clamping members removably attached thereto which clamp on to opposed surfaces on the vessel so as to prevent relative movement between the ring and the vessel in the direction parallel to the axis of the vessel and removable keys extending substantially parallel to the axis of the vessel and positioned between the clamping members and projections on the vessel to reduce angular movement between the vessel and the ring almost to zero.

According to a second aspect of the present invention a hollow vessel has at least one annular ring coaxial with the longitudinal axis thereof and surrounding and spaced from the wall of the vessel, the vessel having pairs of clamping members removably attached thereto which clamp on to opposed surfaces on the ring so as to prevent relative movement between the ring and the vessel in the direction parallel to the axis of the vessel and positioned between the clamping members and projections on the ring to reduce angular movement between the vessel and the ring almost to zero.

Preferably the vessel has a part which is of cylindrical form and the, or each, ring is coaxial with the longitudinal axis of the cylindrical part.

In the embodiment of the invention where the clamping members are removably attached to the vessel, the opposed surfaces may be provided by location pads rigidly attached in spaced apart relation around the periphery of the vessel. In this embodiment of the invention the projections on the vessel comprise further pads interspaced between the location pads.

The clamping members clamped on to the opposed surfaces prevent relative movement between the ring and the vessel in the direction parallel to the longitudinal axis of the vessel and the keys positioned between the clamping members and the projections with a small clearance therebetween reduce angular movement between the vessel and the ring almost to zero but do permit slight relative angular movement to allow for differential expansion between the ring and the vessel.

When the vessel is a converter suitable for use in a steel making process it is desirable that two such annular rings are attached to the vessel, the rings being spaced apart axially along the vessel.

Figure 2:
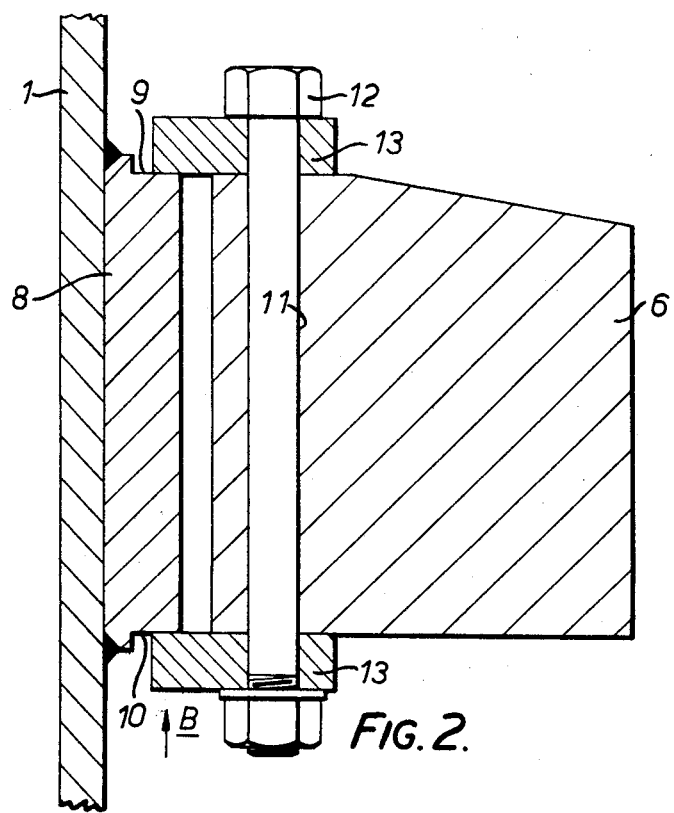

In order that the invention may be more readily understood it will now be described, by way of example only, with reference to the accompanying drawings in which:

FIG. 1 is a side elevation of a converter suitable for use in a steel making operation with a pair of track rings (shown in section) surrounding the vessel, FIG. 2 is a section, to an enlarged scale, of part of one track ring showing how the ring is attached to the vessel, FIG. 3 is a view in the direction of the arrow B of FIG. 2, and FIG. 4 is a view in the direction of the arrow A of FIG. 3 with the track ring omitted.

Referring now to FIG. 1, a hollow vessel suitable for use in the Kaldo steel making process has a central portion 1 which is of cylindrical form and a pair of frusto-conical end portions 2 and 3. A base member 4 closes one end of the vessel and the other end is provided with an annular lip 5. A pair of track rings 6 are positioned around the central portion 1 of the vessel and the rings are coaxial with the longitudinal axis 7 of the vessel. The rings serve to support the vessel and forces are imparted to the vessel by way of the track rings which cause the vessel to rotate about the axis 7. When the vessel is in use and is filled with molten metal differential expansion occurs between the vessel and the rings 6 and to prevent damage to the vessel it is necessary for the rings 6 to be slightly spaced from the vessel to allow for the differential expansion between the vessel and the rings.

Referring now to FIG. 2, a plurality of locating pads 8 are welded to the wall of the vessel and are arranged in spaced apart relation around the periphery of the vessel and positioned between the vessel and each ring 6. Each pad has upper and lower machined surfaces 9 and 10. The ring 6 has a plurality of openings 11 extending therethrough each of which receives a bolt 12 attaching a pair of clamping members in the form of cheek plates 13 to the upper and lower sides respectively of the track ring. The cheek plates project inwardly from the ring and engage in clamping relation with the surfaces 9 and 10 on the location pads. The pads thus serve as projections extending outwardly from the vessel and which co-operate with the projections 13 extending inwardly from the ring. Although in the arrangement shown the cheek plates are bolted to the track ring, in an alternative arrangement the location pads could be enlarged with the cheek plates bolted or otherwise secured to the location pads and overlapping the track ring. It can be seen from FIG. 2 that the ring is prevented from moving in the direction parallel to the longitudinal axis of the vessel by the cheek plates engaging against the location pads. There is however a gap between the location pads and the track ring and this allows differential expansion to take place between the pads and the track ring.

FIG. 3 shows a pair of thrust pads 14 positioned adjacent the ends of each pair of cheek plates. The thrust pads are welded to the wall of the vessel. The thrust pads are spaced from the cheek plates and are positioned in line with the location pads 8. In FIG. 4 keys 15 are shown positioned between the thrust pads 14 and the cheek plates 13 and the keys are held in position by means of set screws 16 fitting into thrust pads. A slight clearance is allowed between each key and the cheek plates to permit radial movement between them and the ends of the cheek plates are machined parallel to ensure that this clearance remains constant as differential expansion occurs. The keys acting between the projections in the form of the thrust pads and the cheek plates reduce relative angular movement between the vessel and ring almost to zero, but permit differential expansion between them.

A vessel constructed in accordance with the present invention is relatively simple to manufacture, and disturbing stresses are prevented from being set up in the vessel or the track rings due to differential expansion between them. If necessary one of the track rings can easily be removed from the vessel without disturbing the other track ring. To remove a track ring from the vessel it is only necessary to remove the set bolts 16 thereby allowing the keys to be removed and then removing the bolts 11 so that the cheek plates can be brought out of engagement with the surfaces 9 and 10 on the location pads. The use of a plurality of separate location and thrust pads on the vessel places less restriction on the design of the vessel than pads extending continuously around the vessel.

What I claim is:

1. A hollow vessel having at least one annular ring coaxial with the longitudinal axis thereof and surrounding and spaced from the wall of the vessel, the ring having pairs of clamping members removably attached thereto which clamp on to opposed surfaces on the vessel so as to prevent relative movement between the ring and the vessel in the direction parallel to the axis of the vessel and removable keys extending substantially parallel to the axis of the vessel and positioned between the clamping members and projections on the vessel to reduce angular movement between the vessel and the ring almost to zero.

2. A hollow vessel having at least one annular ring coaxial with the longitudinal axis thereof and surrounding and spaced from the wall of the vessel, the vessel having pairs of clamping members removably attached thereto which clamp on to opposed surfaces on the ring so as to prevent relative movement between the ring and the vessel in the direction parallel to the axis of the vessel and removable keys extending substantially parallel to the axis of the vessel and positioned between the clamping members and projections on the ring to reduce angular movement between the vessel and the ring almost to zero.

3. A hollow vessel as claimed in claim 1 in which the opposed surfaces are provided by location pads rigidly attached in spaced apart relation around the periphery of the vessel.

4. A hollow vessel as claimed in claim 3 in which the location pads are welded to the vessel.

5. A hollow vessel as claimed in claim 1 in which the projections on the vessel comprise further pads interspaced between the location pads.

6. A hollow vessel as claimed in claim 1 in which the keys are bolted to said projections.

7. A hollow vessel as claimed in claim 1 in which the vessel constitutes a converter for use in a steel making process.

8. A converter vessel as claimed in claim 7 in which two annular rings are provided, the rings being spaced apart in the direction of the longitudinal axis of the vessel.

9. A hollow vessel as claimed in claim 1 wherein at least part of the vessel is of cylindrical form and the, or each, ring is coaxial with the longitudinal axis of the cylindrical part.

* * * * *